UNITED STATES PATENT OFFICE.

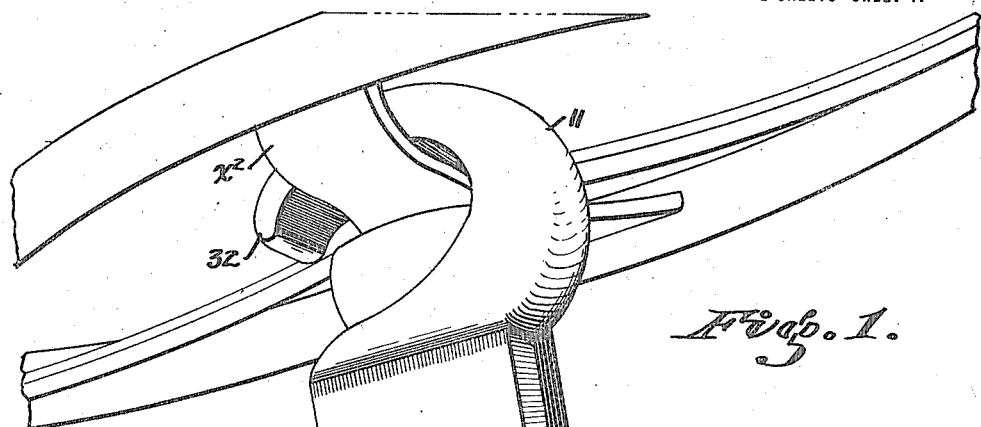

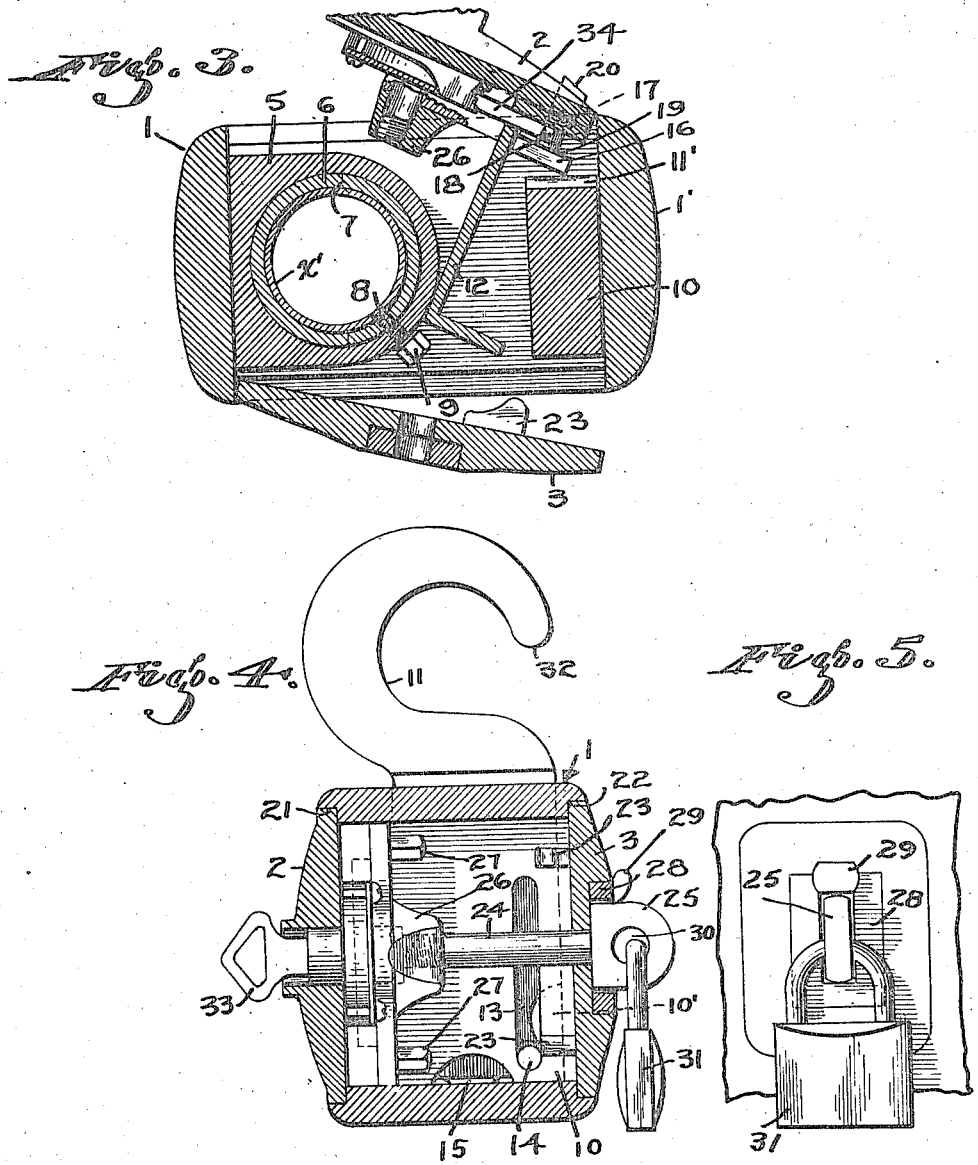

CHARLES A. CONGER, OF OAKLAND, CALIFORNIA.

AUTOMOBILE-LOCK.

1,237,753.

Specification of Letters Patent.    Patented Aug. 21, 1917.

Application filed August 1, 1916. Serial No. 112,555.

*To all whom it may concern:*

Be it known that I, CHARLES A. CONGER, a citizen of the United States, and a resident of the city of Oakland, county of Alameda, State of California, have made a new and useful Invention—to wit, Improvement in Automobile-Locks; and I do hereby declare the following to be a full, clear, concise, and exact description of the same.

The invention relates particularly to means for locking the steering wheel of automobiles with the object of preventing theft and unauthorized use thereof.

In this specification and the annexed drawings, the invention is illustrated in the form considered to be the best, but it is to be understood that the invention is not limited to such form, because it may be embodied in other forms, and it is also to be understood that in and by the claims following the description it is desired to cover the invention in whatever form it may be embodied.

In the accompanying one sheet of drawings:

Figure 1 is a perspective view of an automobile lock constructed in accordance with this invention and applied to the steering column of an automobile, certain of the parts being broken away in cross section to disclose the underlying structure.

Fig. 2 is a rear elevation of the same with the back cover removed and a portion of the casing broken away to disclose the underlying bushing.

Fig. 3 is a plan view from above in cross section on the line III—III, Fig. 2, showing certain of the parts in the act of assembly.

Fig. 4 is a side elevation in cross section taken on the line IV—IV, Fig. 2, showing the hook in the unlocked position.

Fig. 5 is a fragmentary detail illustrating the manner of locking the assembling bolt.

In detail the construction illustrated in the drawings includes: the inclosing casing consisting of a box like structure 1 with the front and back covers 2 and 3, let in flush with the surface of the casing, combined and arranged to completely inclose all of the operating mechanism for attaching the device to the steering column and the locking mechanism except the projecting hook. The casing 1 is installed by removing the steering wheel and passing the steering column $x^1$ through the holes provided therefor in the casing. These holes are provided with the inwardly extending annular flanges 5—5. These holes are provided with the flange bushings 6—6 to accommodate the casing to the various sizes of steering columns. The bushings are preferably divided diametrically so that they may be conveniently assembled about the steering column and forced into the openings in the casing. The separate halves of the bushings are provided with a key and recess engagement as at 7 to prevent longitudinal displacement of the parts of the bushing. At the proper height the steering column is provided with holes to receive the shoulder end 8 of the set screws 9, threaded into the flanges 5 and passing through the bushing 6, to fix the casing on the steering column rigidly at the proper position. The set screws 9 are duplicated in different positions as shown.

The top of the casing is slotted to receive the shank 10 of the hook 11. The front edge of the shank 10 is provided with extended rack teeth 11′. The slot in the casing is a close sliding fit for the shank 10. It is necessary therefore to provide the gap 10′ in the rear edge of the shank to engage the end of the slot to form a radial point while the extended rack teeth 11′ are clearing the opposite end of the slot, in assembling the shank in the casing.

Before inserting the hook fully the cover 2 is placed in the position shown in Fig. 3, the angular extension 12 thereon completely inclosing the shank 10 of the hook when the cover is in the closed position, acting with the end of the casing 1′ to form a rectangular vertical guide for the shank 10. The extension 12 is provided with a slot 13 in which the pin 14 fixed in the lower end of the shank 10, slides the length of the slot limiting the extension of the shank 10 beyond the casing.

The lower end of the shank 10 is provided with the resilient buffer 15 adapted to rest on the bottom of the casing when the hook is in inoperative position to prevent rattling of the hook owing to the vibration of the steering column.

The detent rack 16 is guided in the cover 2 and adapted to move laterally into and out of engagement with the rock teeth 11 on the shank of the hook. This detent preferably extends the full height of the casing to provide a positive engagement for holding the hook at any level at which it may be adjusted. The rack 16 is held normally out of contact with the rack teeth 11 by the spring 17, encircling the stem 18 fixed in the rack 16, and expanding between the end 19 of the extension 12 and the head 20 protruding through the cover 2.

When the cover 2 is in the closed position in the casing, the cover 3 is inserted on the opposite side, the covers 2 and 3 abutting the shoulders 21 and 22 respectively, in the casing, the surface of the casing and the covers being flush to present a neat appearance and to prevent the introduction of a prying tool between the edge of the cover and the casing. The cover 3 is provided with lugs 23 engaging behind the extension 12, to hold the latter firmly against the inner surface of the end 1' of the casing.

The two covers 2 and 3 are drawn snugly into the casing and held in fixed relation by the screw 24, having the head 25 engaging the cover 3 and a threaded end screwed into the lug 26 fixed to the inner side of the cover 2 by the screws 27. The head 25 is flattened (see Fig. 5) and is locked against turning by the locking frame 28, having a central slot engaging the head 25 and having its lateral edges engaging the walls of a recess formed in the cover 3, whereby the frame 28 lies flush with the surface of the cover. The locking frame 28 is provided with the lug 29 for convenience in withdrawing the frame when it is desired to unscrew the bolt 24. The head 25 is provided with the transverse hole 30 to receive the loop of the padlock 31, which prevents the removal of the locking frame 28, preventing access to the interior of the casing unless the padlock 31 is first removed. Attention is drawn to the ingenious way in which the casing is attached to the steering column, the attaching screws 9 being entirely within the casing which prevents the possibility of removal of the casing or tampering with the mechanism except by persons having a key to the lock 31.

Locking the steering wheel is accomplished by elevating the hook 11 into the path of the spoke $x^2$ which passes beneath the point 32 of the hook, when the hook may be depressed and engage the spoke $x^2$. The hook is then locked in this position by pressure on the head 20, forcing the detent 16 into engagement or mesh with the rack teeth 11, in which position it is permanently locked by turning the key 33 controlling the bolt 34, which is advanced between the back of the detent 16 and the face of the end plate 19 to prevent withdrawal of the detent from engagement with the shank 10 of the hook. With the hook locked into engagement with the spoke $x^2$ of the steering wheel, it is impossible to steer the automobile. It is advisable in applying the lock to first cramp the front wheels of the automobile at an angle to the line of progress, then lock the steering wheel as described. Thus placed, it will be impossible to move the machine except in a circle, rendering it unmanageable under its own power.

Having thus described this invention, what I claim and desire to secure by Letters Patent is:

1. An automobile lock including an inclosing casing attachable to a fixed part of an automobile; means for locking the attaching means within said casing; a hook in said casing adapted to engage a movable part of said automobile; and locking means in said casing engaging said hook.

2. An automobile lock including an inclosing casing having openings therein to pass the steering column; bushings interposed between said casing and said column; attaching means passing through said casing and said bushings and engaging said column; locked covers in said casing inclosing said attaching means; a hook in said casing adapted to engage the steering wheel.

3. An automobile lock including an inclosing casing attachable to the steering column; covers on opposite sides of said casing; a bolt engaging both of said covers; means for locking said bolt against withdrawal; a hook adapted to engage the steering wheel and having a shank slidable in said casing; an extension on one of said covers inclosing said shank; a detent guided in said cover adapted to engage said shank; and a lock bolt adapted to be interposed between said detent and said cover.

4. An automobile lock including an inclosing casing attachable to the steering column; covers on opposite sides of said casing; a bolt engaging both of said covers; means for locking said bolt against withdrawal; a hook adapted to engage the steering wheel and having a shank slidable in said casing; an extension on one of said covers inclosing said shank; a pin in said shank engaging a slot in said extension; a detent guided in said cover adapted to engage said shank; and means for locking said detent.

5. An automobile lock including an inclosing casing attachable to the steering column; covers on opposite sides of said casing; a bolt having a head engaging one of said covers and screwed into the other; a locking frame engaging said head and locked into said cover; a hook adapted to engage the steering wheel and having a shank slidable in said casing; and means for locking said shank within said casing.

6. An automobile lock including an inclosing casing attachable to the steering column; covers on opposite sides of said casing; a bolt engaging both of said covers and locked against withdrawal; a hook adapted to engage the steering wheel and having a shank slidable in said casing; an extension on one of said covers incasing said shank; lugs on the opposite cover engaging said extension; a pin in said shank engaging a slot in said extension; a detent guided in one of said covers and adapted to engage said shank; and a lock bolt in said casing adapted to lock said detent.

In testimony whereof, I have hereunto set my hand at San Francisco, California, this 26th day of July 1916.

CHARLES A. CONGER.

In presence of—
BALDWIN VALE.